(12) United States Patent
Frankel

(10) Patent No.: US 8,280,258 B2
(45) Date of Patent: Oct. 2, 2012

(54) OPTICAL COMMUNICATION SYSTEMS AND METHODS UTILIZING A SPLIT AMPLIFICATION BAND AND NONLINEAR COMPENSATION

(75) Inventor: Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 630 days.

(21) Appl. No.: 12/495,634

(22) Filed: Jun. 30, 2009

(65) Prior Publication Data
US 2010/0329686 A1 Dec. 30, 2010

(51) Int. Cl.
*H04J 14/02* (2006.01)
*H04J 14/00* (2006.01)
*H04B 10/12* (2006.01)

(52) U.S. Cl. ............... 398/83; 398/43; 398/82; 398/150
(58) Field of Classification Search .................. None
See application file for complete search history.

(56) References Cited

U.S. PATENT DOCUMENTS

| | | | |
|---|---|---|---|
| 5,532,868 A | 7/1996 | Gnauck et al. | |
| 5,777,770 A * | 7/1998 | Naito | 398/150 |
| 6,160,942 A | 12/2000 | Watanabe | |
| 6,304,348 B1 | 10/2001 | Watanabe | |
| 6,307,984 B1 | 10/2001 | Watanabe | |
| 6,704,519 B1 * | 3/2004 | Brener et al. | 398/160 |
| 6,724,997 B2 * | 4/2004 | Oksanen | 398/150 |
| 6,823,138 B2 * | 11/2004 | Shinoda | 398/14 |
| 7,075,711 B2 * | 7/2006 | Haggans et al. | 359/341.2 |
| 7,092,148 B1 * | 8/2006 | Haggans et al. | 359/337.11 |
| 7,184,410 B1 * | 2/2007 | Frankel et al. | 370/252 |
| 7,242,859 B1 * | 7/2007 | Dasika et al. | 398/3 |
| 7,310,318 B1 * | 12/2007 | Frankel et al. | 370/252 |
| 7,343,101 B1 * | 3/2008 | Frankel et al. | 398/158 |
| 7,512,343 B2 * | 3/2009 | Sridhar et al. | 398/147 |
| 7,558,485 B2 * | 7/2009 | Chowdhury et al. | 398/150 |
| 2001/0013965 A1 * | 8/2001 | Watanabe | 359/161 |
| 2001/0017960 A1 * | 8/2001 | Terahara | 385/24 |

(Continued)

OTHER PUBLICATIONS

Lucerol; "Impact of bit pattern and dispersion variation on cross-phase modulation penalty"; A. J. Lucero, et al., Optical Fiber Communications Conference Technical Digest, 1999, vol. 3, pp. 37-38. (and references therein).

(Continued)

*Primary Examiner* — Kenneth N Vanderpuye
*Assistant Examiner* — Amritbir Sandhu
(74) *Attorney, Agent, or Firm* — Clements Bernard PLLC; Christopher L. Bernard; Lawrence A. Baratta, Jr.

(57) ABSTRACT

The present disclosure provides optical communication systems and methods that utilize, on top or in place of the conventional framework: (1) optical amplifiers that are provided with extended bandwidth coverage, such as Extended Band Erbium-Doped Fiber Amplifiers (EDFAs), combination of Raman amplifiers and EDFAs, Split-Band C+L EDFAs, etc.; (2) ROADMs that are configured in a conventional manner in a portion of the optical amplification spectrum—providing connectivity between network nodes with adjacency within conventional unregenerated optical reach; (3) an optical amplification spectrum with a portion reserved for "ultra-express" channels between far-spaced network nodes, with OPC mechanisms placed exclusively in this portion of the optical amplification spectrum to extend unregenerated optical reach; (4) "express" channels that effectively bypass intermediate ROADM hardware via band filtering, thereby minimizing detrimental filtering and amplified spontaneous emission (ASE) accumulation impacts; and (5) if optical reach to far-off ROADM nodes is required, a loopback at the terminal.

14 Claims, 11 Drawing Sheets

U.S. PATENT DOCUMENTS

| | | | | |
|---|---|---|---|---|
| 2002/0012148 | A1* | 1/2002 | Oksanen | 359/161 |
| 2002/0054427 | A1* | 5/2002 | Islam | 359/349 |
| 2003/0048509 | A1* | 3/2003 | Shinoda | 359/134 |
| 2003/0099015 | A1* | 5/2003 | Kelly et al. | 359/127 |
| 2005/0286119 | A1* | 12/2005 | Wysocki et al. | 359/338 |
| 2006/0045541 | A1* | 3/2006 | Chowdhury et al. | 398/188 |
| 2008/0193133 | A1* | 8/2008 | Krug et al. | 398/83 |
| 2009/0232492 | A1* | 9/2009 | Blair et al. | 398/5 |

OTHER PUBLICATIONS

Nelson, "Resonances in cross-phase modulation impairment in wavelength-division-multiplexed lightwave transmission"; Nelson, L.E.; Jopson, R.M.; Gnauck, A.H.; Chraplyvy, A.R., IEEE Photonics Technology Letters, vol. 11, Issue 7, Jul. 1999, pp. 907-909.

Evangelides, Cross phase modulation resonances in WDM systems:, S.G. Evangelides Jr., Optical Fiber Communications Conference Technical Digest, 1999, vol. 3, pp. 240-242.

Bellotti, "10×10 Gb/s cross-phase modulation suppressor for multispan transmissions using WDM narrow-band fiber Bragg gratings"; Bellotti, G.; Bigo, S.; Cortes, P.Y.; Gauchard, S; LaRochelle, S., IEEE Photonics Technology Letters, vol. 12, issue 10, Oct. 2000, pp. 2403-2405.

Yariv, "Compensation for channel dispersion by nonlinear optical phase conjugation"; A. Yarvi, D. Fekete and D.M. Pepper, Opt. Lett., 1978.

Lorattanasane, "Design theory of long distance optical transmission systems using midway optical phase conjugation"; C. Lorattanasane, K. Kikuchi, J. Lightwave Tech., vol. 15, pp. 948-955, Jun. 1997.

Merker, "High bit rate OTDM transmission over standard fiber using mid-span spectral inversion and its applications", IEEE J. Sel. Top. Quant. Electr., vol. 6, pp. 258-262, Mar. 2000.

Kaewplung, "Feasibility of 100-gb/s 10000-km single-channel optical transmission by midway optical phase conjugation incorporated with third-order dispersion compensation"; IEEE Phot. Techn. Lett., vol. 13, pp. 293-295, Apr. 2001.

Cortes, "Numerical simulation of 10-Gbit/s transmission over 9000 km with 50-km amplifier spacing using optical phase conjugation in the terminal unit"; 1997 Optical Fiber Comm. Conference Technical Digest, pp. 201-202.

Chou, "Optical frequency mixers for WDM and TDM applications"; M.S. Chou, K. Parameswaran, M.M. Fejer, 2000 Optical Fiber Comm Conference Technical Digest, paper FB1-1.

Grandpeirre, "Theory of stimulated Raman scattering cancellation in wavelength-division-multiplexed systems via spectral inversion"; IEEE Phot. Techn. Lett., vol. 11, pp. 1271-1273, Oct. 1999.

\* cited by examiner

OPTICAL COMMUNICATION SYSTEMS AND METHODS UTILIZING A SPLIT AMPLIFICATION BAND AND NONLINEAR COMPENSATION

FIELD OF THE INVENTION

The present invention relates generally to optical communication systems and methods. More specifically, the present invention relates to optical communication systems and methods utilizing a split amplification band and nonlinear compensation, such that nonlinear impairments like cross-talk may be effectively mitigated. The present invention finds application in the deployment and improvement of fiber optic communication networks.

BACKGROUND OF THE INVENTION

Fiber optic communication networks are increasingly being deployed with rapid growth. Especially rapid is the growth of segments that carry multi-gigabit digital data on multiple wavelengths over a single fiber optic strand. The wavelength channel density and data rate carried on an individual wavelength continues to increase, especially for 100 G optical communication systems with multi-symbol modulation constellations and tight channel spacing. Both of these advancements, however, lead to an increase in nonlinear impairments like cross-talk. For passive optical fibers, the cross-talk mechanisms include cross-phase modulation (XPM), four-wave mixing, and Raman cross-talk.

These non-linear impairments, arising due to Kerr nonlinearity and the Raman effect, are additive to the overall interference level. The addition occurs in terms of each additional wavelength channel contributing a cross-talk component to the overall interference level. It is well known to those of ordinary skill in the art that the details of the bit pattern on each channel are important to the accurate estimation of the noise levels. The additive effect also occurs in optical communication systems that have multiple optical spans with intermediate optical amplification, such that each optical span additively contributes a cross-talk component to the overall noise level. The additive property of cross-talk implies that, whenever there is signal correlation, the interference level will be maximized. At the same time, signal anti-correlation may be used to minimize the interference level.

Optical phase conjugation (OPC) has been considered by many for the purpose of combating dispersive broadening. Early work considered only the linear dispersive signal distortion, which was compensated for by positioning the OPC mechanism in the center of the optical fiber link. Subsequent work considered that intra-channel signal distortion, such as self-phase modulation (SPM), induced by the Kerr effect in an optical fiber, may also be compensated for by positioning the OPC mechanism in the center of the optical fiber link. Such simultaneous compensation of dispersion and SPM places simultaneous constraints on the approximate equality of both optical fiber transmission dispersion and accumulated nonlinear phase shift on the opposite sides of the optical fiber link. This has been considered in conjunction with applications for single wavelength channel systems, for example. Other work has considered the benefits of OPC for single channel performance improvements with simultaneous dispersion compensation. Still other work has considered a specific implementation of OPC that introduces its own dispersion and ways to mitigate the dispersion with a corresponding dispersion compensation module (DCM).

Extensions to wavelength-division multiplexed (WDM) optical communication systems have also explicitly concentrated on the application of OPC to mitigating dispersion and four-wave mixing, independently and collectively. Stimulated Raman scattering effects on WDM optical communication systems, and the use of OPC for associated mitigation, has been considered, but under the assumption of unmodulated, and, hence, undispersed, optical carriers with a single input and single output optical fiber link.

Commonly assigned U.S. Pat. No. 7,310,318 (Dec. 18, 2007), discloses the use of OPC in conjunction with dispersion compensation for the express purpose of overcoming optical communication system impairments induced by Kerr effect nonlinearity in multi-channel WDM optical communication systems with multiple optically-amplified optical fiber spans. Both intra-channel SPM and inter-channel XPM accumulated over multiple spans may thus be mitigated. Further, extensions to the multi-channel WDM optical communication systems must account for the inherent gradual difference in dispersion presented by the optical transmission fiber to the individual channels as they change from short to long wavelengths. This dispersion slope across the wavelength range occupied by the channels significantly impairs the effectiveness of the impairment mitigation. Further, the presence of reconfigurable optical add/drop multiplexers (ROADMs) and complex channel traffic patterns reduces the mitigation effectiveness.

Thus, the current state of the art considers OPC for point-to-point optical links. There are two primary reasons for this: (1) OPC nonlinear XPM cancellation only works acceptably if near-neighbor channels have the same start and end points, such that the OPC mechanism may be positioned approximately half-way through the optical communication system to provide for effective nonlinear cancellation and (2) OPC flips channel wavelengths around the central spectrum pump (for example, a 40-channel optical communication system with an OPC pump located at channel 20 flips channels 19-21, 18-22, 17-23, etc.)—thus, managing channel assignments is very difficult in optical communication systems with many ROADMs.

BRIEF SUMMARY OF THE INVENTION

In various exemplary embodiments, as an overview, the present invention provides optical communication systems and methods that utilize, on top or in place of the conventional framework: (1) optical amplifiers that are provided with extended bandwidth coverage, such as Extended Band Erbium-Doped Fiber Amplifiers (EDFAs), combination of Raman amplifiers and EDFAs, Split-Band C+L EDFAs, Tellurite-Doped Fiber Amplifiers (TDFAs), or the like; (2) ROADMs that are configured in a conventional manner in a portion of the optical amplification spectrum—providing connectivity between network nodes with adjacency within conventional unregenerated optical reach; (3) an optical amplification spectrum with a portion reserved for "ultra-express" channels between far-spaced network nodes, with OPC mechanisms placed exclusively in this portion of the optical amplification spectrum to extend unregenerated optical reach; (4) "express" channels that effectively bypass intermediate ROADM hardware via band filtering, thereby minimizing detrimental filtering and amplified spontaneous emission (ASE) accumulation impacts; and (5) if optical reach to far-off ROADM nodes is required, a loopback at the terminal.

In an exemplary embodiment, an optical communication system includes one or more optical amplifiers, wherein each of the one or more optical amplifiers has extended bandwidth coverage, and wherein an optical amplification spectrum of each of the one or more optical amplifiers is partitioned into a set of short connection channels associated with a first set of network nodes and a set of express connection channels associated with a second set of network nodes; one or more reconfigurable optical add/drop multiplexers in a first configuration operable to multiplex channels in a portion of the optical amplification spectrum associated with the short connection channels; and one or more multiplexers in a second configuration operable to multiplex channels in a portion of the optical amplification spectrum associated with the express connection channels; wherein the one or more optical amplifiers are disposed between the one or more reconfigurable optical add/drop multiplexers and the one or more multiplexers. Each of the one or more optical amplifiers includes one or more of an Extended Band Erbium-Doped Fiber Amplifier, a Raman amplifier, a Split-Band C+L Erbium-Doped Fiber Amplifier, a Semiconductor Optical Amplifier, and a Tellurite-Doped Fiber Amplifier. The optical communication system further includes an optical phase conjugator disposed at one of the one or more optical amplifiers, wherein the optical phase conjugator operates on the express connection channels. The optical phase conjugator includes a thin-film optical filter configured to separate the express connection channels and the short connection channels, a high power laser pump, and a passive $LiNbO_3$ crystal to provide a non-linear optical phase conjugation function on the express connection channels. The optical amplification spectrum includes at least 128 channels on a 50 GHz grid spacing. The express connection channels utilize any of quadrature phase shift keying (QPSK), differential QPSK (DQPSK), polarization multiplexing, 16-quadrature amplitude modulation (16-QAM), and optical frequency division multiplexing (OFDM). At least one of the express connection channels is configured in a loop-back configuration.

In another exemplary embodiment, an optical network includes a plurality of optical amplifiers, wherein each of the plurality of optical amplifiers has extended bandwidth coverage, and wherein an optical amplification spectrum of each of the plurality of optical amplifiers is partitioned into a set of short connection channels and a set of express connection channels; a plurality of terminal nodes including at least one of the plurality of optical amplifiers; a plurality of optical add/drop nodes including at least one of the plurality of optical amplifiers; one or more amplifier nodes including at least one of the plurality of optical amplifiers; and optical fiber interconnection the plurality of terminal nodes, the plurality of optical add/drop nodes, and the one or more amplifier nodes. The optical network further includes, at the plurality of terminal nodes, one or more transceivers for the express connection channels and one or more transceivers for the short connection channels; and at the plurality of optical add/drop nodes, one or more transceivers for the short connection channels and a band filter to express the express connection channels. Each of the plurality of optical amplifiers includes one or more of an Extended Band Erbium-Doped Fiber Amplifier, a Raman amplifier, a Split-Band C+L Erbium-Doped Fiber Amplifier, a Semiconductor Optical Amplifier, and a Tellurite-Doped Fiber Amplifier. The optical network further includes an optical phase conjugator disposed at one of the one or more amplifier nodes, wherein the optical phase conjugator operates on the express connection channels. The optical phase conjugator includes a thin-film optical filter configured to separate the express connection channels and the short connection channels, a high power laser pump, and a passive $LiNbO_3$ crystal to provide a non-linear optical phase conjugation function on the express connection channels. The optical amplification spectrum includes at least 128 channels on a 50 GHz grid spacing. The express connection channels utilize any of quadrature phase shift keying (QPSK), differential QPSK (DQPSK), polarization multiplexing, 16-quadrature amplitude modulation (16-QAM), and optical frequency division multiplexing (OFDM). At least one of the express connection channels is configured in a loop-back configuration at one of the plurality of terminal nodes to enable termination at one of the plurality of optical add/drop nodes. The optical network further includes, at the plurality of terminal nodes, fixed multiplexers for the one or more transceivers for the express connection channels and a reconfigurable optical add/drop multiplexer for the one or more transceivers for the short connection channels; and at the plurality of optical add/drop nodes, a reconfigurable optical add/drop multiplexer for one or more transceivers for the short connection channels.

In yet another exemplary embodiment, an optical method includes receiving a plurality of wavelengths within an optical amplification spectrum of an extended-band optical amplifier, wherein the optical amplification spectrum is partitioned into a set of short connection channels associated with a first set of network nodes and a set of express connection channels associated with a second set of network nodes; amplifying the entire optical amplification spectrum including the set of short connection channels and the set of express connection channels; splitting the set of short connection channels and the set of express connection channels; performing optical phase conjugation on the set of express connection channels; and combining the set of short connection channels and the set of express connection channels.

BRIEF DESCRIPTION OF THE DRAWINGS

The present invention is illustrated and described herein with reference to the various drawings, in which like reference numbers are used to denote like system components, as appropriate, and in which.

DETAILED DESCRIPTION OF THE INVENTION

Again, in various exemplary embodiments, as an overview, the present invention provides optical communication systems and methods that utilize, on top or in place of the conventional framework: (1) optical amplifiers that are provided with extended bandwidth coverage, such as Extended Band Erbium-Doped Fiber Amplifiers (EDFAs), combination of Raman amplifiers and EDFAs, Split-Band C+L EDFAs, Tellurite-Doped Fiber Amplifiers (TDFAs), or the like; (2) ROADMs that are configured in a conventional manner in a portion of the optical amplification spectrum—providing connectivity between network nodes with adjacency within conventional unregenerated optical reach; (3) an optical amplification spectrum with a portion reserved for "ultra-express" channels between far-spaced network nodes, with OPC mechanisms placed exclusively in this portion of the optical amplification spectrum to extend unregenerated optical reach; (4) "express" channels that effectively bypass intermediate ROADM hardware via band filtering, thereby minimizing detrimental filtering and amplified spontaneous emission (ASE) accumulation impacts; and (5) if optical reach to far-off ROADM nodes is required, a loopback at the terminal. The optical communication systems and methods of the present invention utilize a split amplification band and nonlinear compensation for ultra-express channels in the split amplification band to remedy the above problems with conventional optical communication systems and methods, such that nonlinear impairments like cross-talk may be effectively mitigated.

Figure 1:
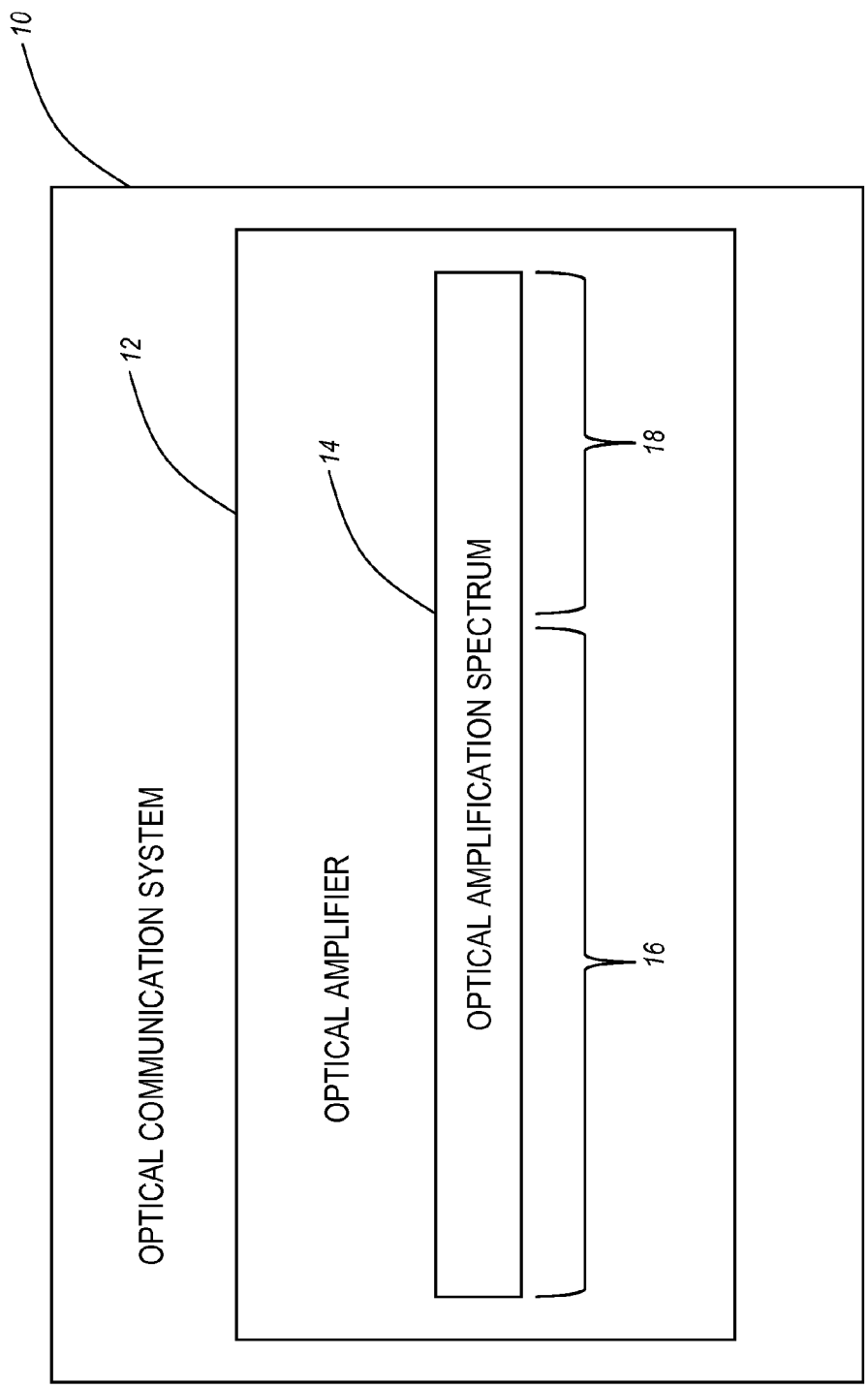
FIG. 1 is an optical communication system with optical amplifiers that are each essentially partitioned and implemented as an Extended Band EDFA according to an exemplary embodiment of the present invention.

Referring to FIG. 1, in one exemplary embodiment, an optical communication system 10 of the present invention includes optical amplifiers 12 that are each essentially partitioned and implemented as an Extended Band EDFA (or a combination of a Raman amplifier and an EDFA, a Split-Band C+L EDFA, a TDFA, semiconductor optical amplifier (SOA), or the like) such that they have extended bandwidth coverage, with, for example, a capacity of 128 channels on a 50 GHz ITU grid. For example, the optical amplifiers 12 can include wavelength amplification support for wavelengths from approximately 1530 nm to 1615 nm. Alternatively, the optical amplifiers 12 can include a traditional C-band amplifier with a splitter to another L-band amplifier, e.g. an overlay configuration in existing networks. ROADMs are configured in a conventional manner in a portion of an optical amplification spectrum 14—providing connectivity between network nodes with adjacency within conventional unregenerated optical reach. In this example, 88 channels 16 for shorter connections are configured as for conventional C-Band EDFA capacity, and are allocated to be covered by conventional commercially-available ROADM components. A portion of the optical amplification spectrum 14 is reserved for "ultra-express" channels between far-spaced network nodes, with OPC mechanisms placed exclusively in this portion of the optical amplification spectrum 14 to extend unregenerated optical reach (i.e. approximately 2300 km for 40 G/50 GHz and approximately 1300 km for 100 G/50 GHz). In this example, the remaining 40 channels 18 for "ultra-express" connections are band filtered at each ROADM node to provide "ultra-express" bypass. Those of ordinary skill in the art will recognize that the 88 channels 16 and the 40 channels 18 are described herein for exemplary illustration purposes. The 88 channels 16 represent conventional C-band wavelengths and these can be any number, e.g. 40, 80, 92, etc., as allowed by a channel plan. The 40 channels 18 represent extended L-band (or equivalent) ultra-express channels, and similarly these can include any number as allowed by the channel plan.

Figure 2:
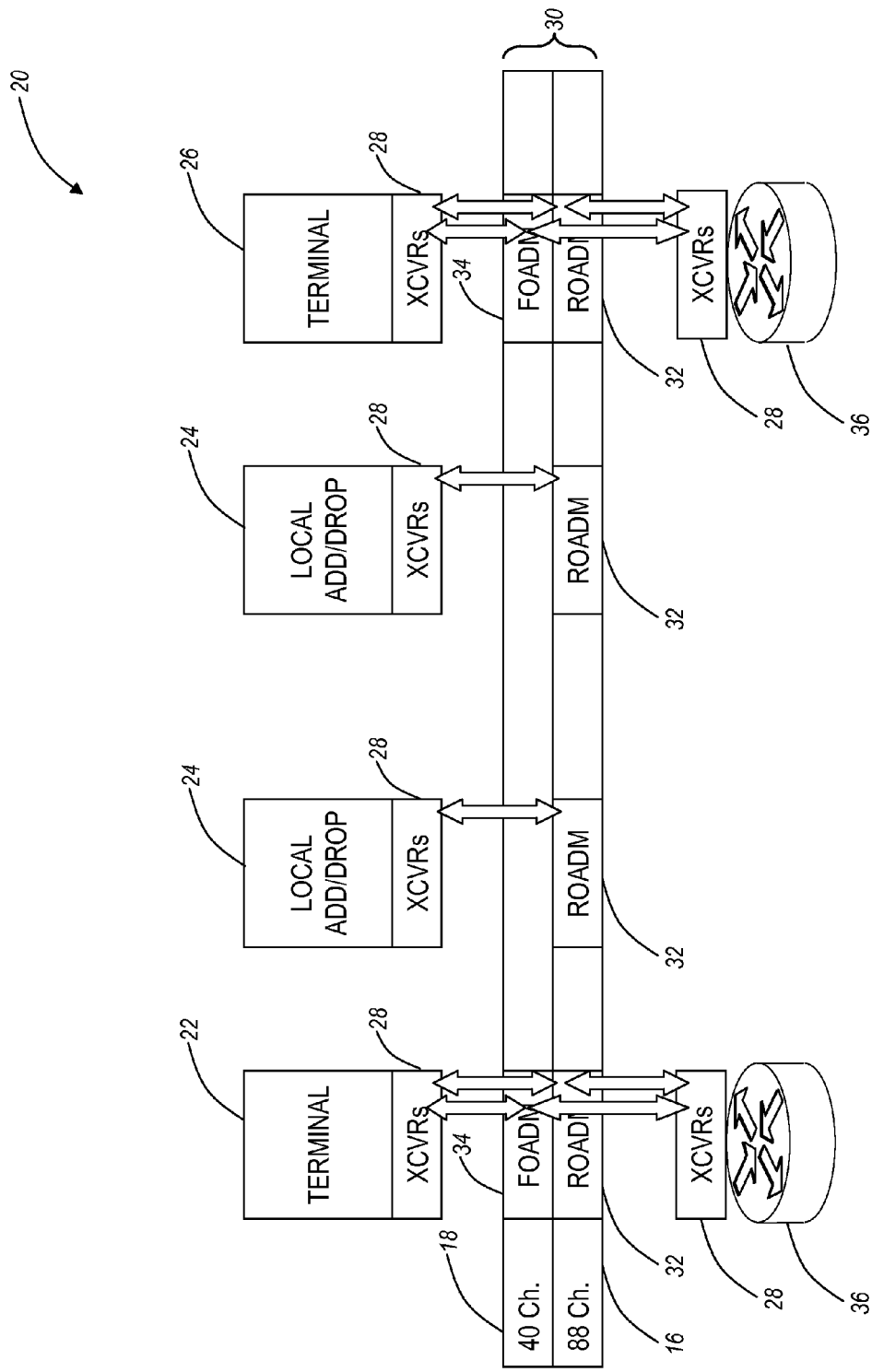
FIG. 2 is a typical link configuration the optical communication system of FIG. 1 according to an exemplary embodiment of the present invention.

Referring to FIG. 2, in an exemplary embodiment, a typical link configuration 20 is illustrated of the optical communication system 10 of the present invention. The link configuration 20 includes a terminal 22, local add/drop nodes 24, and a terminal 26, each of which include one or more transceivers (XCVR) 28. The link configuration 20 includes the optical amplifiers 12 with extended bandwidth coverage and with the 88 channels 16 and the 40 channels 18 for "ultra-express" connections. The 88 channels 16 and the 40 channels 18 are transported over one or more optical fibers 30 that interconnect the terminal 22, the local add/drop nodes 24, and the terminal 26. At the terminal 22, the local add/drop nodes 24, and the terminal 26, there are OADM devices 32, 34 or equivalent to add/drop channels 16, 18 from the optical fibers 30. The present invention contemplates separate add/drop devices for the 88 channels 16 and the 40 channels 18. Specifically, the 88 channels 16 can be added/dropped at any of the terminal 22, the local add/drop nodes 24, and the terminal 26, whereas the 40 channels 18 are express channels that are added/dropped solely at the terminals 22, 26. In the exemplary embodiment of FIG. 2, each of the terminal 22, the local add/drop nodes 24, and the terminal 26 include a ROADM 32 for adding/dropping any of the 88 channels 16. The terminals 22, 26 include a FOADM 34 (fixed OADM) to drop each of the 40 channels 18. The ROADM 32 and FOADM 34 are shown as an exemplary embodiment, and the present invention contemplates any device for accessing the 88 channels 16 and the 40 channels 18 at the various sites. The present invention contemplates the 40 channels 18 are express point-to-point links that are fully-dropped at each terminal 22, 26 in a network. In this example, the 40 channels 18 are illustrated terminating on one or more transceivers (XCVR) 28 in routers/switches 36. For example, the 40 channels 18 can be 100 gigabit Ethernet channels.

Figure 3:
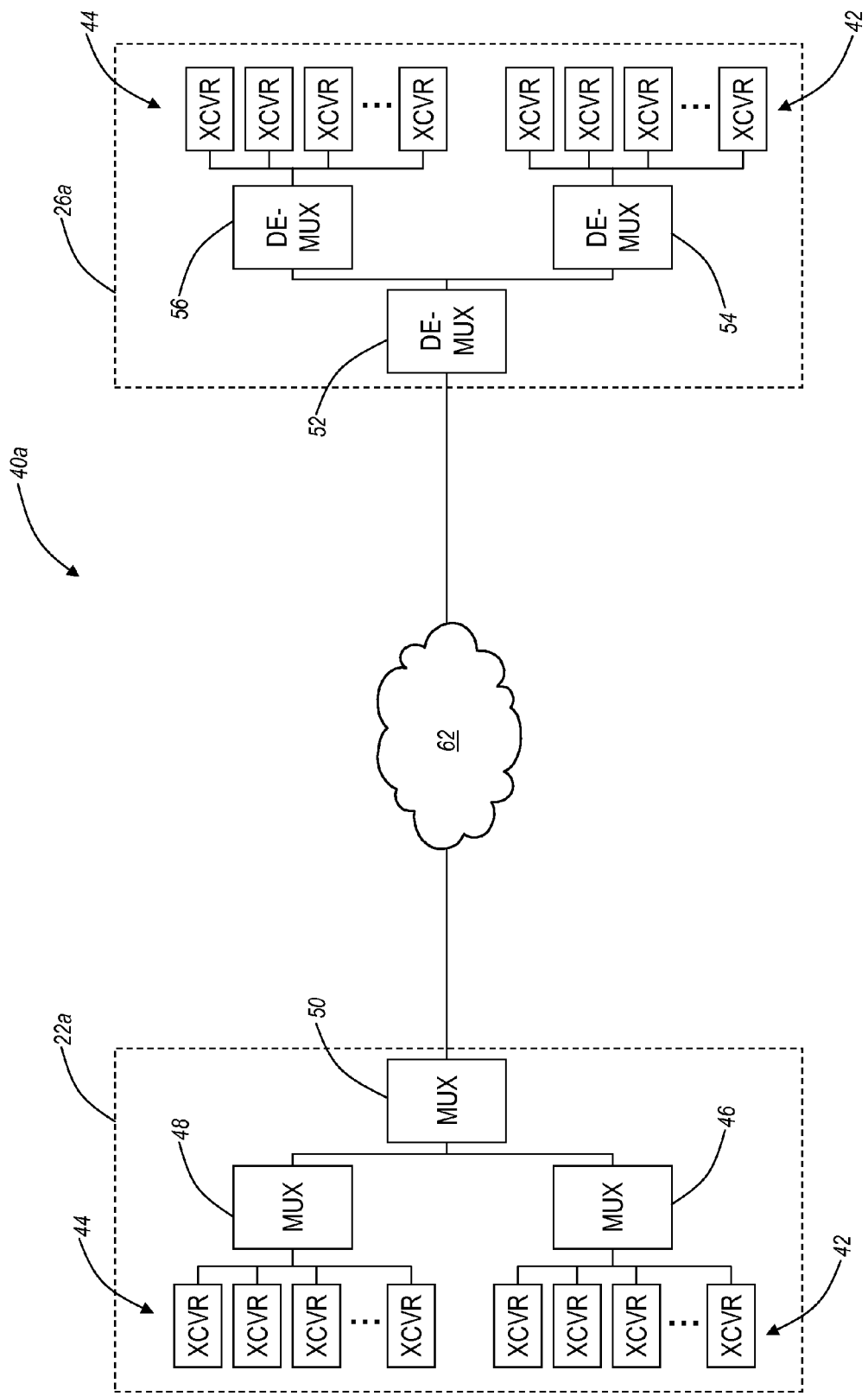
FIG. 3 is an optical terminal configuration of the optical communication system of FIG. 1 utilizing fixed multiplexers and de-multiplexers according to an exemplary embodiment of the present invention.
Figure 4:
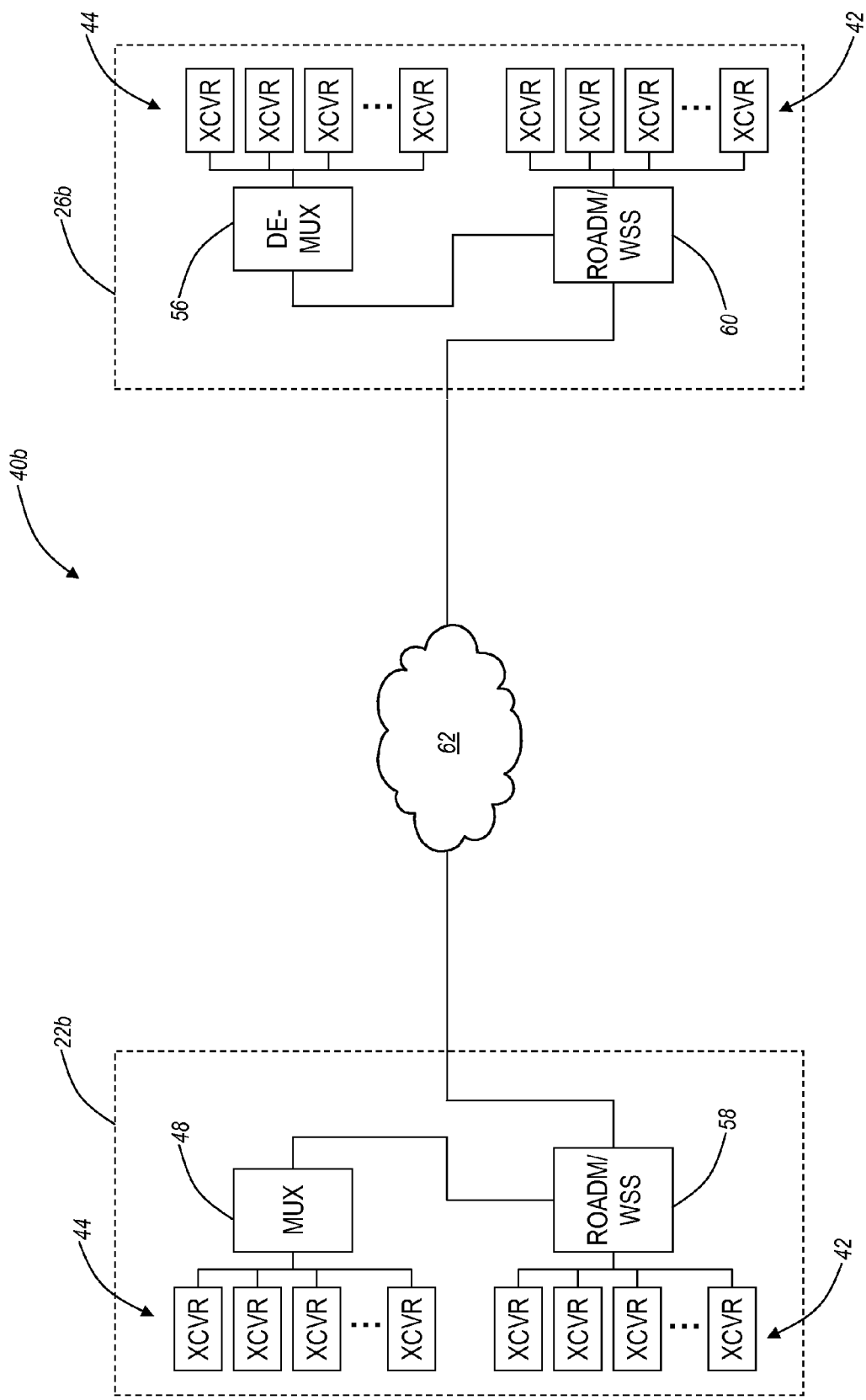
FIG. 4 is an optical terminal configuration of the optical communication system of FIG. 1 utilizing ROADMs/Wavelength Selective Switches (WSS) with fixed multiplexers and de-multiplexers for ultra-express channels according to an exemplary embodiment of the present invention.

Referring to FIGS. 3 and 4, in an exemplary embodiment, optical terminal configurations 40a, 40b are illustrated of the optical communication system 10 of the present invention. FIG. 3 illustrates the optical terminal configuration 40a with terminals 22a, 26a utilizing fixed multiplexing/de-multiplexing devices, and FIG. 4 illustrates the optical terminal configuration 40b with terminals 22a, 26a utilizing a ROADM for the 88 channels 16 and fixed multiplexing/de-multiplexing devices for the 40 channels 18. Each of the terminals 22, 26 include a plurality of transceivers 42 for the 88 channels 16 and a plurality of transceivers 44 for the 40 channels 18. In FIG. 3, the terminal 22a includes a multiplexer 46 that multiplexes the transceivers 42 and a multiplexer 48 that multiplexes the transceivers 44. The multiplexers 46, 48 are then combined through a multiplexer 50 that combines the 88 channels 16 and the 40 channels 18. The terminal 26a includes a de-multiplexer 52 that de-multiplexes the 88 channels 16 and the 40 channels 18 and sends them to de-multiplexers 54, 56. In FIG. 4, the terminal 22b includes the multiplexer 48 that connects to a ROADM/WSS 58 (Wavelength Selective Switch). The terminal 22b includes a ROADM/WSS 60 that includes an output to the de-multiplexer 56. The terminals 22, 26 are in communication over an optical network 62 that includes a plurality of the optical amplifiers 12.

Figure 5:
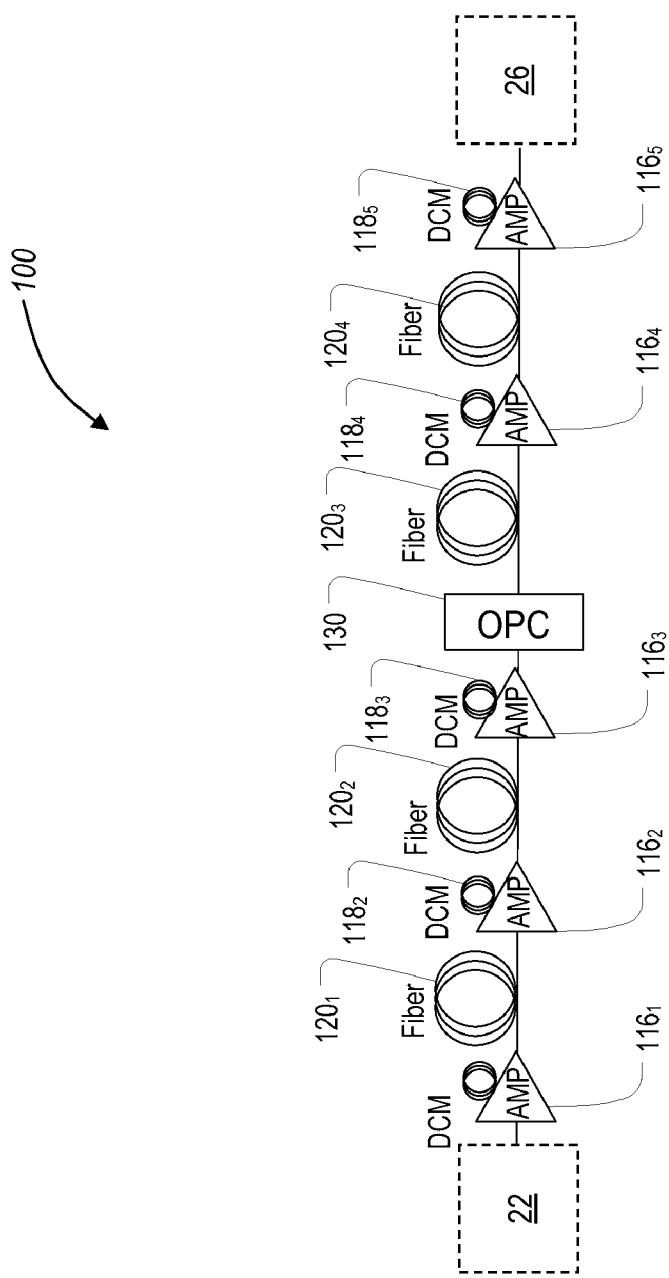
FIG. 5 is an optical link configuration for the optical communication system of FIG. 1 according to an exemplary embodiment of the present invention.

Referring to FIG. 5, in an exemplary embodiment, an optical link configuration 100 is illustrated of the optical communication system 10 of the present invention. The optical link configuration 100 connects the terminals 22, 26 and the associated 88 channels 16 and the 40 channels 18 (collectively referred to as a multiplexed optical signal). The multiplexed signal is optically communicated to an amplifier 116 which is one of the optical amplifiers 12. Also depicted at each amplifier 116 is a dispersion compensation module (DCM) 118. It is understood that the DCM 118 need not be positioned at the amplifier site and may be positioned at any location along the transmission path. Alternatively, the DCM 118 may be included as a component within an amplifier 116 or the DCM 118 may be implemented as part of fiber link 120 (e.g., a length of dispersion compensating fiber in the link). The path from the terminals 22, 26 is referred to as a span. A section of fiber joining two components is referred to as a link. The optical communications network may include a number of spans. The optical link configuration 100 provides periodic amplification and periodic dispersion compensation over fiber links 120 both before and after optical phase conjugator (OPC) 130.

The DCM 118 provides compensation for chromatic dispersion and may include a length of dispersion compensating fiber having a dispersion coefficient and length suitable to substantially counteract dispersion in the preceding fiber link. In addition, the DCM's 118 positioned after the OPC 130 may substantially compensate for chromatic dispersion and/or dispersion slope introduced by the OPC 130. Alternatively, the DCM's 118 may provide distributed dispersion compensation. In other words, the DCM's 118 are spread out across multiple links to compensate for dispersion and dispersion slope values in an "averaged" sense across multiple fiber links. Dispersion compensation can be accomplished using conventional techniques. Some examples may include, dispersion compensating fiber, dispersion compensating fiber Bragg gratings, dispersion compensating thin film filters, etc. In addition, the DCM 118 may control dispersion slope such that the amount of accumulated dispersion is substantially uniform across multiple channels. It is preferable to not compensate for dispersion exactly, as such compensation may lead to adverse resonant effects. In an alternate embodiment, the dispersion compensation and/or dispersion slope compensation may be provided by including dispersion compensating fiber as part of the fiber link 120. Thus, the DCM 118 is not limited to components or devices separate from the fiber link 120, but may be implemented as part of the fiber link 120. The DCM 118 optically communicates with the fiber link 120. In an exemplary embodiment, the fiber link 120 is non-dispersion shifted fiber (NDSF) but may be implemented using other types of fiber such as dispersion-shifted fiber (DSF), non-zero dispersion-shifted fiber (NZ-DSF), and the like. The fiber link 120 optically communicates with further amplifiers 116n, DCM's 118n and fiber links 120n that make up the optical link configuration 100.

Also located in the transmission path is an optical phase conjugator 130. Optical phase conjugators 130 provide a mechanism for compensating for non-linear effects associated with optical signals (i.e., wavelengths) propagating in an optical fiber. Optical phase conjugation works on the principle of spectrum inversion. Basically, as an optical signal travels through the optical fiber it experiences optical phase shifts introduced both by itself and by adjacent optical channels. In the spectral domain, these non-linear effects change the frequency content of the signal. Such phase shifts and frequency components are added with signs determined by the intensity edge slope. If such a signal passes through a device (i.e., a phase conjugator) where its optical spectrum is inverted, (that is made into a mirror image of the input), then propagation through the remaining portion of the optical fiber tends to unravel the non-linear effects impressed on the signal prior to passing through the phase conjugator. If the first and second portion of the optical fiber (the first portion being before the conjugator and the second portion after the conjugator) are roughly equal in length, dispersion and optical power, complete cancellation of the non-linear effects can be achieved in theory. Optical phase conjugation can also be used to cancel dispersive effects in optical fiber. Early applications of optical phase conjugators 130 were for compensating linear dispersion. The early work considered only the linear dispersive signal distortion, which could be compensated by positioning the OPC 130 in the center of the span. Subsequent applications included compensating intra-channel distortion, such as SPM, induced by Kerr effect in the fiber, by positioning the OPC 130 in the center of the span. Such simultaneous compensation of chromatic dispersion and non-linear effects (e.g., SPM) places simultaneous constraints on the approximate equality of both transmission fiber dispersion and accumulated nonlinear phase shift on the opposite sides of the span.

Figure 7:
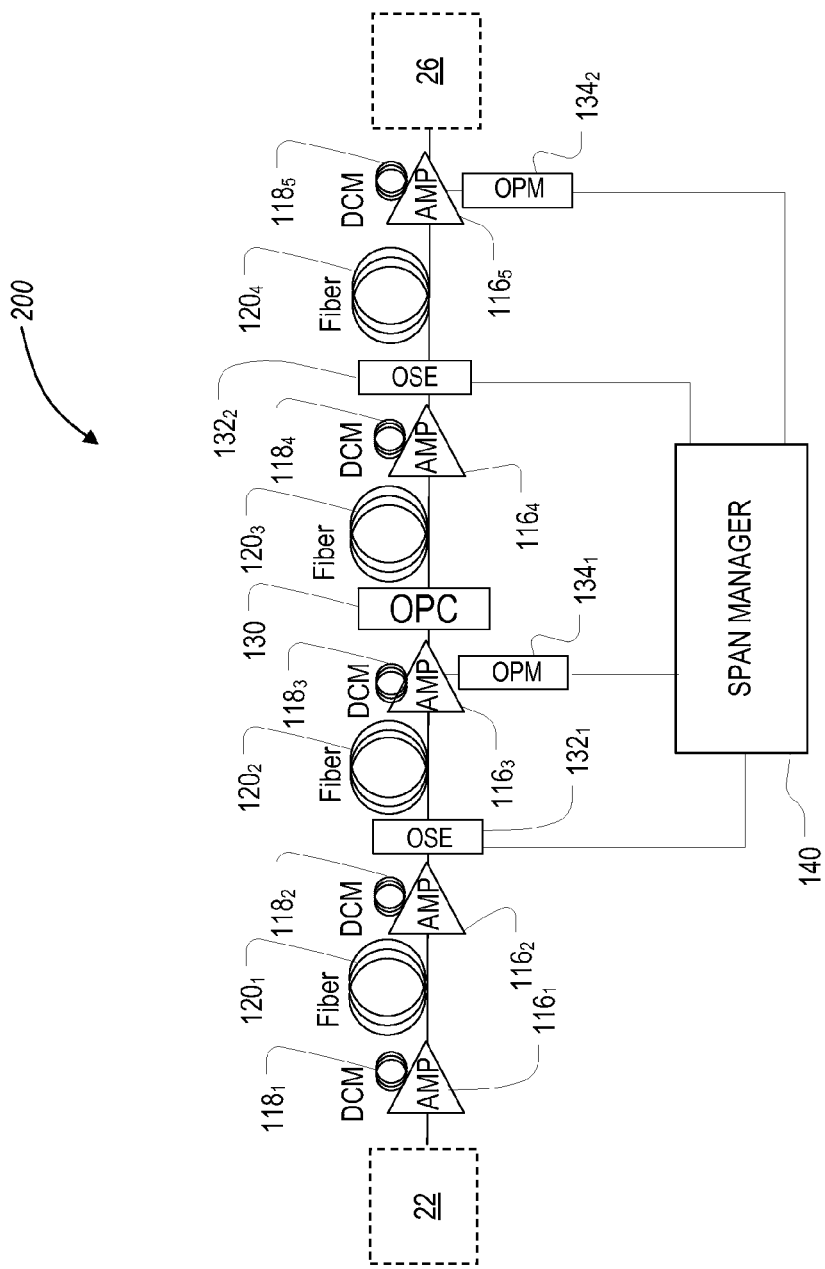
FIG. 7 is another optical link configuration for the optical communication system of FIG. 1 according to an exemplary embodiment of the present invention.

In the exemplary embodiment of FIG. 7, the OPC 130 is disposed between the terminals 22, 26 so that non-linear effects experienced prior to the OPC 130 are compensated for by the transmission path after the OPC 130. The OPC 130 are used exclusively with the 40 channels 18 of the optical amplification spectrum 14 to extend unregenerated reach for the "express" channels. Specifically, the 40 channels 18 are split from the 88 channels 16 prior to the OPC 130 with the 40 channels 18 traversing the OPC 130 while the 88 channels 16 bypass the OPC 130. If the transmission path for the 40 channels 18 experiences substantially constant non-linear effects per unit length, the OPC 130 may be placed approximately at the physical center of the transmission path. Of course, if the transmission path has varying non-linear effects, then the OPC 130 is positioned so that the accumulated non-linear effects prior to the OPC 130 are canceled by non-linear effects after the OPC 130.

The OPC 130 may be implemented using known techniques. For example, four-wave mixing in a highly nonlinear fiber can be used to generate the optically-conjugated wave. Another example may be the use of four-wave mixing in a semiconductor optical amplifier. Another example may be the use of three-wave mixing in an electro-optic waveguide, as could be made with a $LiNbO_3$ material. Such devices typically employ a pumping light source for outputting a pumping light and a non-linear optical material for receiving signal light and the pumping light. An optical filter may be used to separate the phase conjugate light from non-phase conjugate light as desired.

Figure 6:
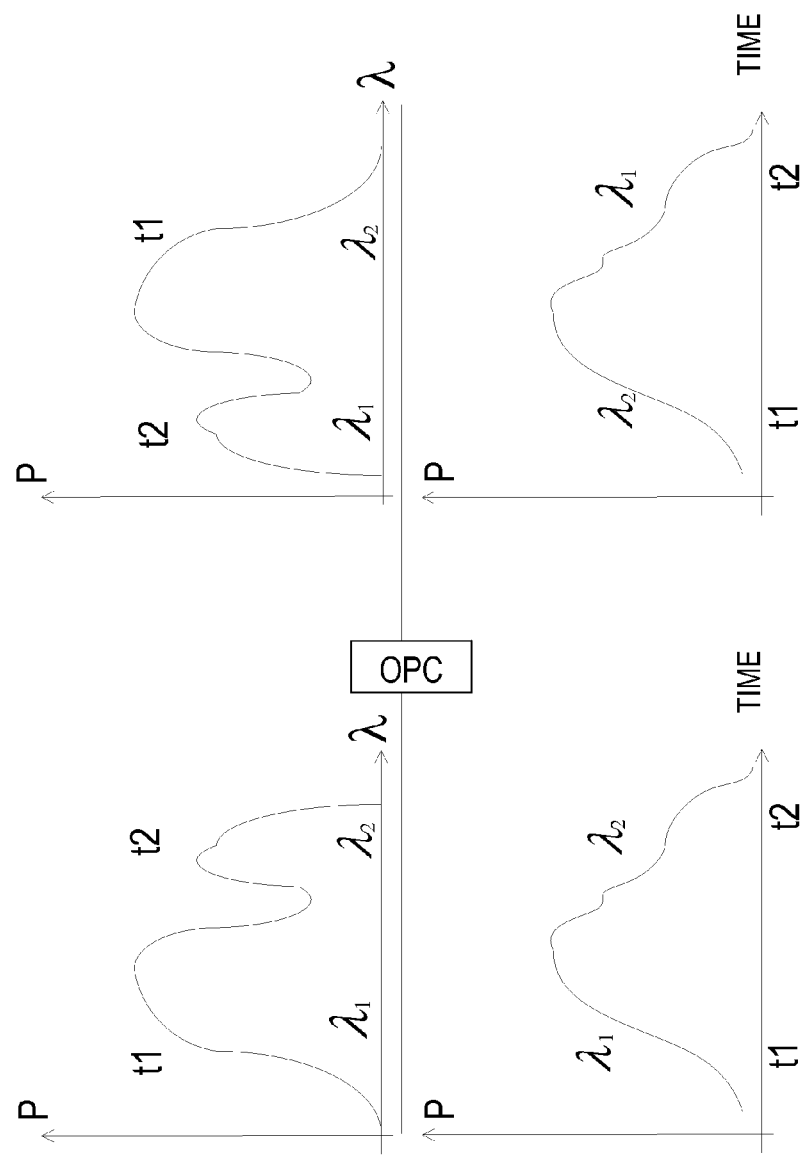
FIG. 6 are graphs illustrating the effect of optical phase conjugation on an optical signal.

The OPC 130 receives the incoming multiplexed signal and produces a conjugate signal with a spectrally inverted, shifted, and phase-conjugated characteristics. FIG. 6 depicts optical power versus wavelength and optical power versus time both before and after the OPC 130. As shown in FIG. 6, the OPC 130 repositions wavelengths in a pulse so that leading edge wavelengths $\lambda_2$ are placed at the trailing edge of the conjugated pulse and trailing edge wavelengths $\lambda_1$ are placed at the leading edge of the conjugated pulse. This conjugate signal is again propagated though a series of fiber links 120, with periodic amplification at amplifiers 116 and dispersion compensation at DCM's 118. The non-linear effects that are added after the OPC 130 by the fiber links act to cancel a portion of the non-linear effects accumulated before the OPC 130. Thus, as the signal propagates, the non-linear effects are gradually mitigated resulting in a performance improvement relative to a similar system without OPC 130. The non-linear effects are mitigated up to the point where the nonlinear effects accumulated in front of the OPC are largely cancelled by the propagation after the OPC. Beyond this distance, the non-linear effects start to grow again.

In the optical link configuration 100, the dispersion compensation modules 118 are separate components from the OPC 130. Thus, the compensation of dispersion (and optionally dispersion slope) is decoupled from the compensation of non-linear effects. This eliminates the trade-offs often encountered when attempting to correct both dispersion and non-linear effects with a common device. Accordingly, more accurate compensation of dispersion and non-linear effects may be achieved.

FIG. 7 depicts an optical link configuration 200 according to another exemplary embodiment of the present invention. Several non-linear effects are dependent on the power of the signal. A more accurate cancellation of non-linear effects, both due to Kerr non-linearity and due to Raman scattering, relies on a proper balance of accumulated dispersion and power in each of the optical carrier wavelengths. Power non-uniformity may be introduced by mechanisms such as wavelength-dependent fiber loss, optical amplifier gain ripple, and stimulated Raman inter-channel power transfer. The optical link configuration 200 shows an embodiment that includes optical power measurement (OPM) device 134 and optical power spectral equalizer (OSE) 132. The OPM device 134 monitors power across channels and the OSE 132 attenuates channel power(s) so that each channel has substantially equal power. The OPM device 134 is normally out of the optical signal path so it does not directly modify the signals. The OSE 132 is in the optical path to achieve desired signal manipulation. All non-linear effects (e.g., self-phase modulation, cross-phase modulation) are power dependent. By controlling power across channels, non-linear effects accumulate in a similar manner for each channel. This facilitates compensation of the non-linear effects since each channel can be compensated in a similar manner. By controlling power across channels, more accurate compensation is achieved.

As shown in the optical link configuration 200, OPM device 134 and OSE 132 may be placed on both sides of the OPC 130. This allows the signal prior to the OPC 130 to have substantially the same power as the conjugate signal after the OPC 130. Accordingly, the power-dependent, non-linear effects accumulated prior to the OPC 130 are substantially cancelled by the transmission path after the OPC 130. Control of the OSE's may be performed by a span manager 140 in communication with the OSE's 132 and OPM devices 134. The span manager 140 may communicate with the OSE's 132 and the OPM devices 134 using known techniques (e.g., over an in-band or out-of-band service channel, overlay IP network, etc.). The span manager 140 communicates with the OPM devices 134 and receives information about the state of the optical signals (e.g., power, wavelength, and OSNR) at that point in the optical link configuration 200. The span manager 140 then directs the OSE's 132 to change attenuation levels for different channels to provide substantially uniform power across channels. The span manager 140 may poll the OPM devices 134 additionally to ensure that the desired result is achieved. One OPM device 134 and one OSE 132 may be designated for controlling optical power in a sub-span. The power management performed by the span manager 140 may be local, on a sub-span basis or global across multiple sub-spans.

Figure 8:
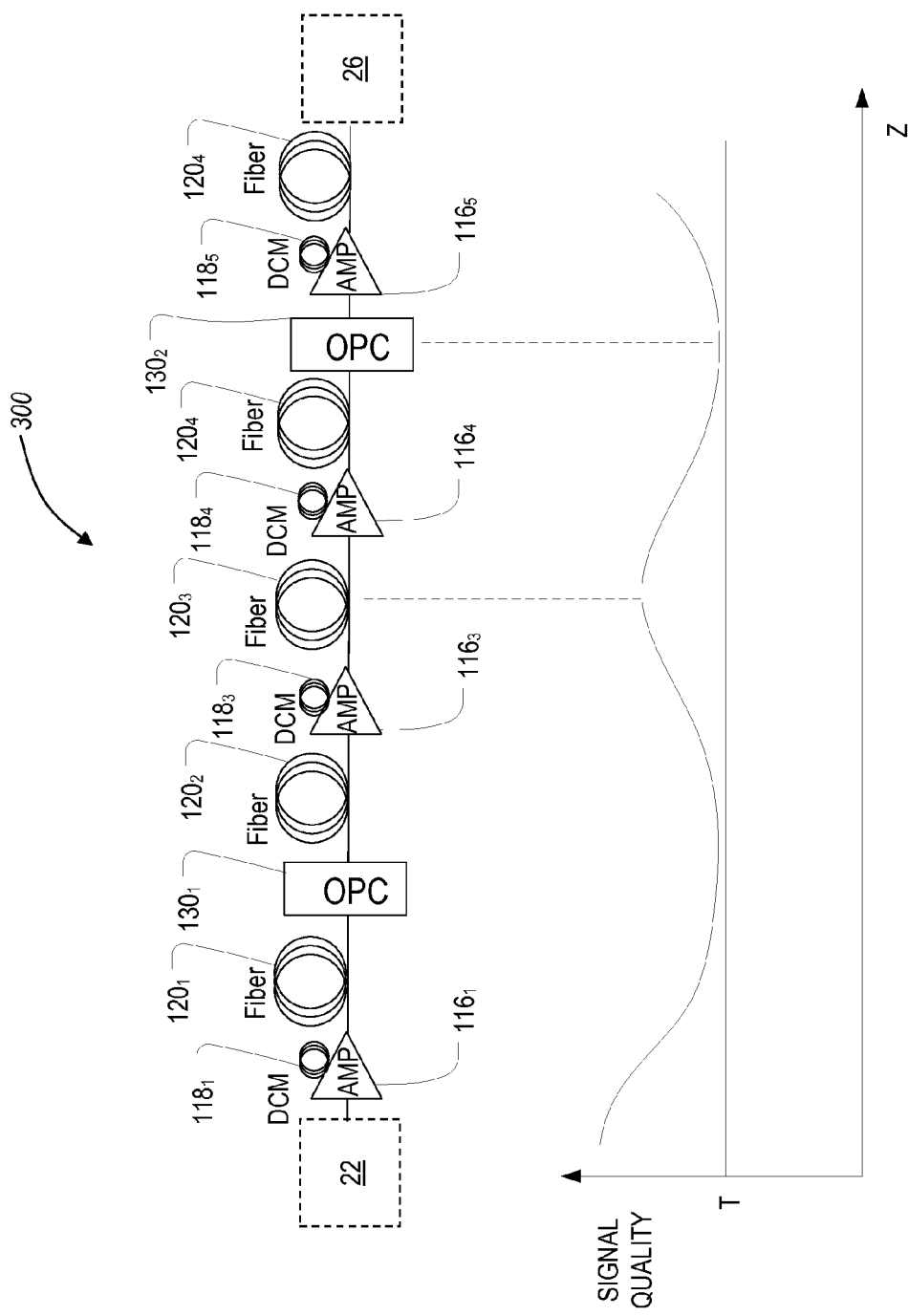
FIG. 8 is yet another optical link configuration for the optical communication system of FIG. 1 according to an exemplary embodiment of the present invention.

Multiple OPC's 130 may be positioned along the transmission path between the terminals 22, 26 to prevent excessive accumulation of nonlinear impairments, especially in cases where the fiber links are substantially different, or where wavelength channels may need to be dropped or added at intermediate points. FIG. 8 depicts an optical link configuration 300 in another exemplary embodiment of the present invention where the transmission path includes a plurality of OPC's $130_1$ and $130_2$. Also shown in FIG. 8 is a plot of signal quality with respect to position along the transmission path. The signal quality may be represented by bit error rate, signal-noise ratio, etc. and is only exemplary to illustrate the effect of the OPC's. As shown in FIG. 8, the initial signal quality deteriorates due to due to noise accumulation and non-linear effects until the signal reaches first OPC $130_1$ at which point the conjugate signal is generated. After OPC $130_1$, the signal quality increases due to the non-linear effects being applied to the conjugate signal. After some point, the non-linear effects created prior to OPC $130_1$ are compensated and the non-linear effects begin to have deleterious effect on the signal until reaching OPC $130_2$. At OPC $130_2$, the signal is subjected to conjugation and thereafter the non-linear effects experienced prior to OPC $30_2$ are compensated. The OPC's 130 may be located along the transmission path so that the signal quality is prevented from dropping below a limit, shown as T in FIG. 8.

In the above described exemplary embodiments, for the 40 channels 18, DCM's 118 are used to compensate linear effects such as dispersion and dispersion slope. The OPC's 130 are used to compensate non-linear effects such as self-phase modulation, cross-phase modulation, etc. Compensating linear effects and non-linear effects using separate devices provides a greater degree of control and allows compensation to be enhanced for each type of effect. In addition, OPM devices 32 and OSE's 34 may be used to control the power across channels providing yet another degree of control. Additionally, the 88 channels 16 can include DCM's 118 and the like (not shown) as required for compensation of linear effects.

Figure 9:
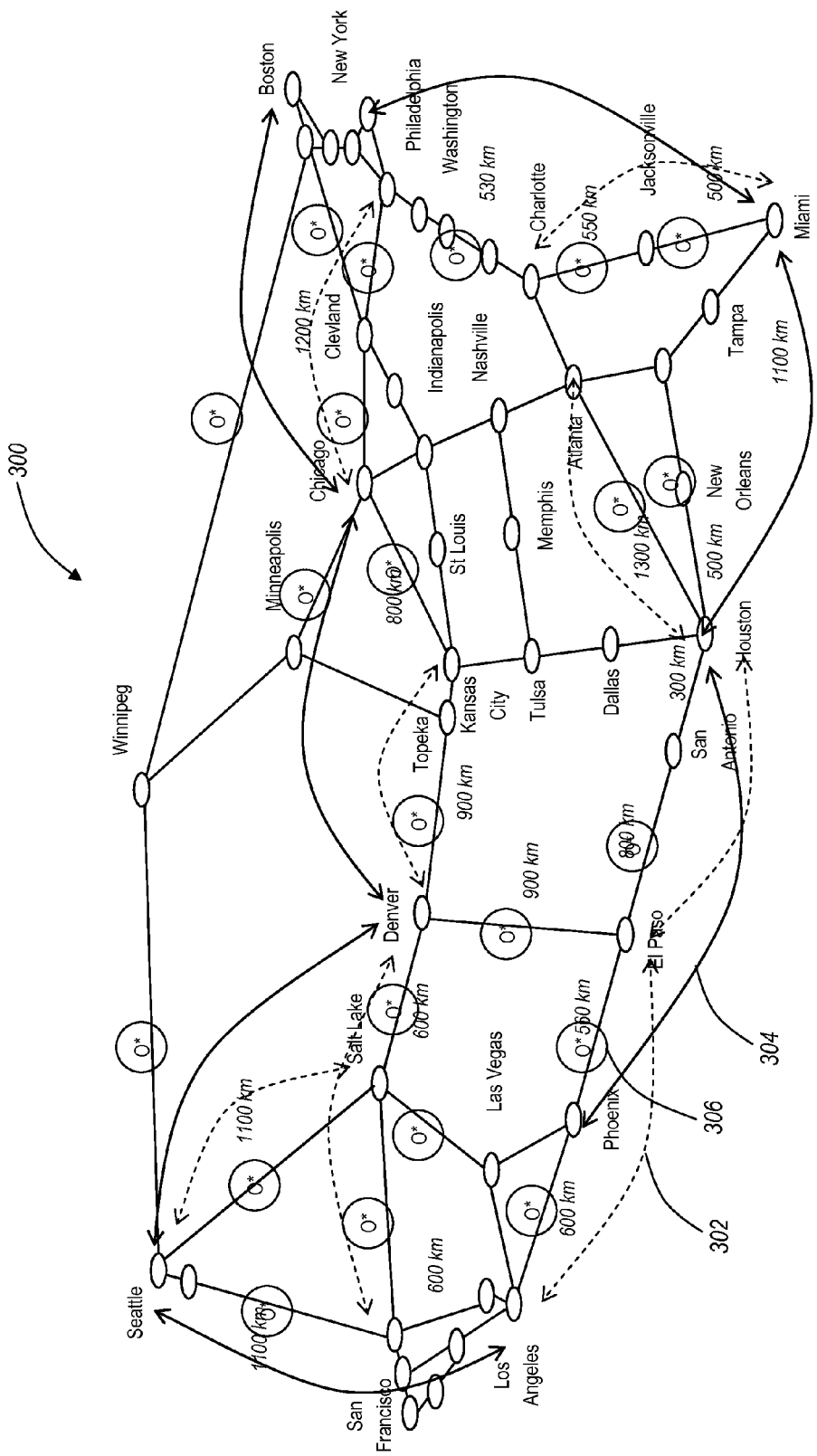
FIG. 9 is a typical continental U.S. network-wide implementation of the optical communication system of FIG. 1 according to an exemplary embodiment of the present invention.

Referring to FIG. 9, in an exemplary embodiment, a typical continental US (CONUS) network-wide implementation 300 of the present invention is illustrated. For illustration purposes, the network shows only major city nodes, and those of ordinary skill of the art will recognize there can be numerous intermediate nodes and amplifier locations. The network-wide implementation 300 utilizes the optical amplifiers 12 and the OPCs 130. The major city nodes include configurations such as described with respect to the terminals 22, 26. There can be numerous intermediate ROADM nodes 24 (not shown). Specifically, the 40 channels 18 are configured to express between the major city nodes while sharing the optical amplifiers 12 with the 88 channels 16.

Figure 10:
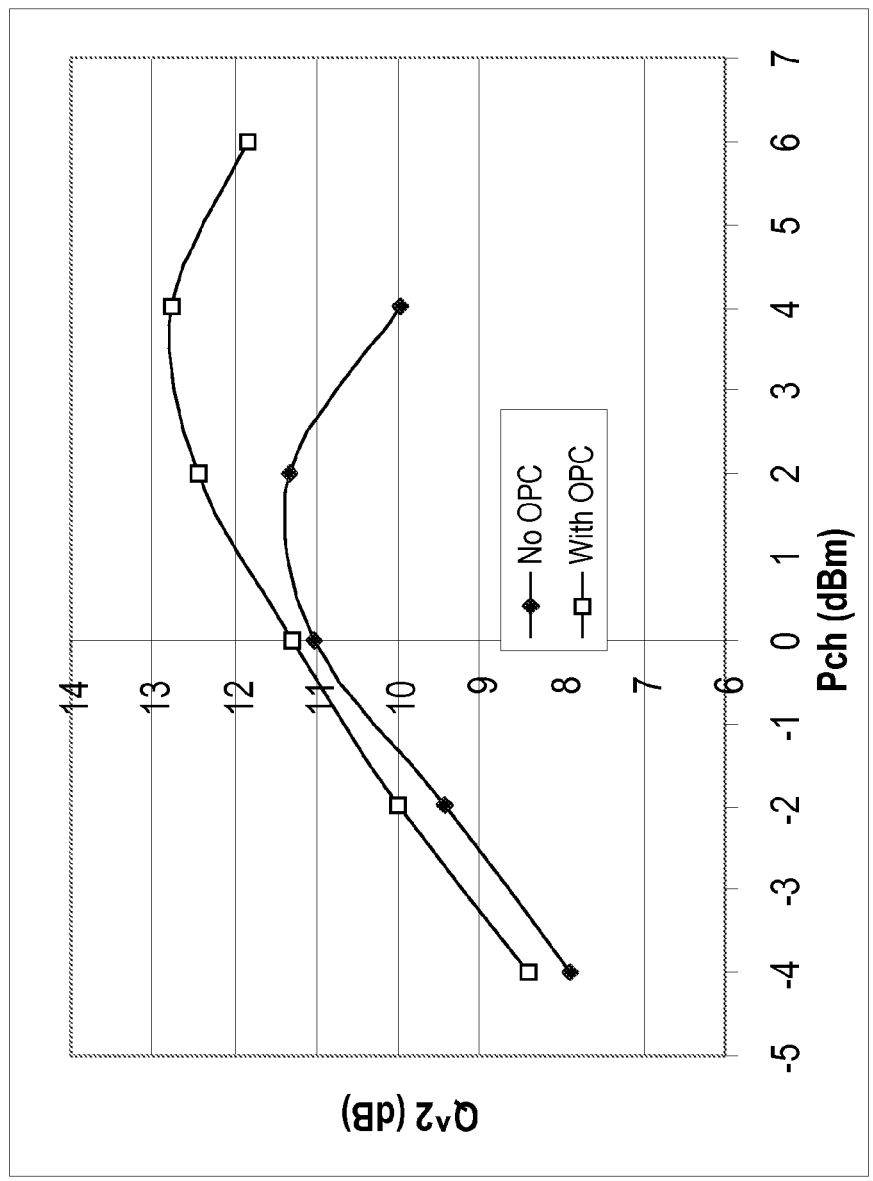
FIG. 10 is a graph illustrating extended reach performance due to optical phase conjugation according to an exemplary embodiment of the present invention.

In an exemplary embodiment, the 40 channels 18 can include 100 Gbps channels using a variety of modulation or multiplexing techniques, such as quadrature phase shift keying (QPSK), differential QPSK (DQPSK), polarization multiplexing, 16-quadrature amplitude modulation (16-QAM), optical frequency division multiplexing (OFDM), and the like. These conventional techniques can achieve approximately 1000-1200 km optical reach. However, modeling of the techniques of the present invention has shown judicious placement of OPC modules can increase unregenerated reach extended by approximately 50%. FIG. 10 illustrates a graph showing modeling of OPC as a reach booster for a 112 Gbps polarization multiplexed return-to-zero DQPSK signal. The graph illustrates signal quality as a function of power and an approximate 3 dB power gain as a result of OPC. In FIG. 9, dotted-lines 302 illustrate non-OPC reach with regular lines 304 illustrating unregenerated reach with OPCs 306. Thus, the segmentation of the optical amplifiers 12 and the optical phase conjugation on the 40 channels 18 can provide an overlaid ultra-express high-capacity network.

As described herein, mitigation of fiber-generated non-linear impairments is critical for high-data rate channels with high packing density. Increased use of multi-level modulation such as QPSK, 16-QAM or OFDM for 100 Gbps and above transport substantially increases the susceptibility of channels to non-linear penalties. Further, coherent detection allows very tight channel spacing which further increases nonlinear cross-talk between near-neighbor channels. Nonlinear impairments may be mitigated by other methods, such as reducing optical power. This method increases linear noise, and reduces unregenerated reach. Lower reach results in much more frequent placement of expensive OEO transceivers. Nonlinear compensation via electronic processing has been proposed by others. This method shows only a small benefit, while requiring extremely large computational power and expense at each electronic Receiver. For example, power consumption may be above ~100 W per Receiver channel in such approaches. This would consume ~4 kW of power for a nominal 40-channel system.

Figure 11:
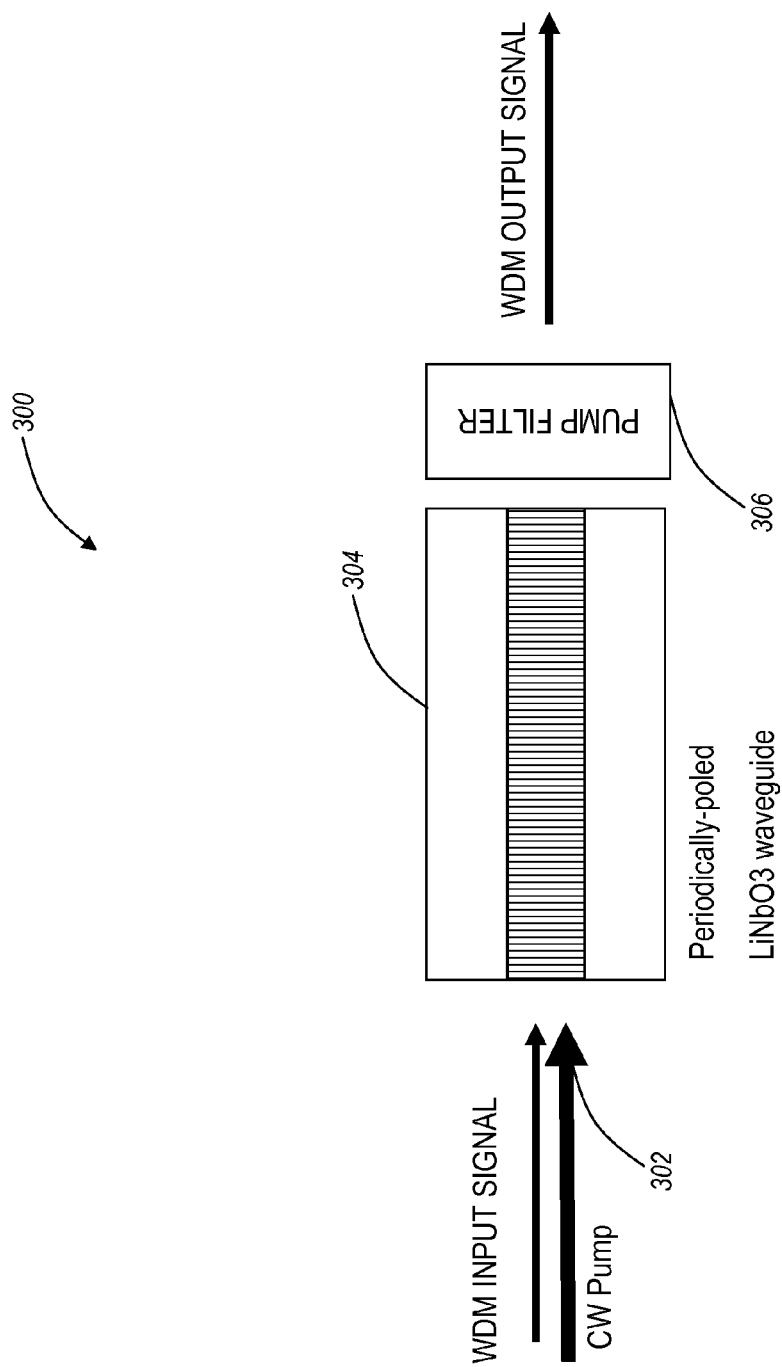
FIG. 11 is a diagram of an exemplary optical phase conjugator (OPC) according to an exemplary embodiment of the present invention.

Referring to FIG. 11, in contrast, OPC is a relatively simple device. In one exemplary implementation as depicted in FIG. 11, an OPC 300 includes thin-film optical filters to separate High and Low channel bands, e.g. the 88 channels 16 and the 40 channels 18, a high power laser pump 302, a passive, periodically-poled, LiNbO$_3$ crystal 304 to provide non-linear optical phase conjugation function, and a pump filter 306. An OPC may consume a total of approximately 50 W of power, but it operates on all channels simultaneously, and it is positioned one or two times in a link. Thus, normalized power consumption per channel may be approximately 1.5 W, i.e. close to a factor of 100 reduction from electrical processing.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An optical communication system, comprising:
   one or more optical amplifiers, wherein each of the one or more optical amplifiers has extended bandwidth coverage, and wherein an optical amplification spectrum of each of the one or more optical amplifiers is partitioned into a set of short connection channels associated with a first set of network nodes and a set of express connection channels associated with a second set of network nodes;
   one or more reconfigurable optical add/drop multiplexers in a first configuration operable to multiplex channels in a portion of the optical amplification spectrum associated with the short connection channels;
   one or more multiplexers in a second configuration operable to multiplex channels in a portion of the optical amplification spectrum associated with the express connection channels;
   wherein the one or more optical amplifiers are disposed between the one or more reconfigurable optical add/drop multiplexers and the one or more multiplexers;
   at a plurality of terminal nodes, one or more transceivers for the express connection channels, one or more transceivers for the short connection channels, fixed multiplexers for the one or more transceivers for the express connection channels, and a reconfigurable optical add/drop multiplexer for the one or more transceivers for the short connection channels;
   at a plurality of optical add/drop nodes, one or more transceivers for the short connection channels, a band filter to pass the express connection channels, and a reconfigurable optical add/drop multiplexer for one or more transceivers for the short connection channels; and
   an optical phase conjugator disposed at one of the one or more optical amplifiers, wherein the optical phase conjugator operates on the express connection channels.

2. The optical communication system of claim 1, wherein each of the one or more optical amplifiers comprises one or more of an Extended Band Erbium-Doped Fiber Amplifier, a Raman amplifier, a Split-Band C+L Erbium-Doped Fiber Amplifier, a Semiconductor Optical Amplifier, and a Tellurite-Doped Fiber Amplifier.

3. The optical communication system of claim 1, further comprising an optical phase conjugator disposed at one of the one or more optical amplifiers, wherein the optical phase conjugator operates on the express connection channels.

4. The optical communication system of claim 3, wherein the optical phase conjugator comprises a thin-film optical filter configured to separate the express connection channels and the short connection channels, a high power laser pump, and a passive LiNbO$_3$ crystal to provide a non-linear optical phase conjugation function on the express connection channels.

5. The optical communication system of claim 3, wherein the optical amplification spectrum comprises at least 128 channels on a 50 GHz grid spacing.

6. The optical communication system of claim 3, wherein the express connection channels utilize any of quadrature phase shift keying (QPSK), differential QPSK (DQPSK), polarization multiplexing, 16-quadrature amplitude modulation (16-QAM), and optical frequency division multiplexing (OFDM).

7. The optical communication system of claim 3, wherein at least one of the express connection channels is configured in a loop-back configuration.

8. An optical network, comprising:
   a plurality of optical amplifiers, wherein each of the plurality of optical amplifiers has extended bandwidth coverage, and wherein an optical amplification spectrum of each of the plurality of optical amplifiers is partitioned into a set of short connection channels and a set of express connection channels;
   a plurality of terminal nodes comprising at least one of the plurality of optical amplifiers;
   a plurality of optical add/drop nodes comprising at least one of the plurality of optical amplifiers;
   one or more amplifier nodes comprising at least one of the plurality of optical amplifiers;
   optical fiber interconnection the plurality of terminal nodes, the plurality of optical add/drop nodes, and the one or more amplifier nodes;
   at the plurality of terminal nodes, one or more transceivers for the express connection channels and one or more transceivers for the short connection channels, and fixed multiplexers for the one or more transceivers for the express connection channels and a reconfigurable optical add/drop multiplexer for the one or more transceivers for the short connection channels;
   at the plurality of optical add/drop nodes, one or more transceivers for the short connection channels and a band filter to pass the express connection channels, and a reconfigurable optical add/drop multiplexer for one or more transceivers for the short connection channels; and an optical phase conjugator disposed at one of the one or more amplifier nodes, wherein the optical phase conjugator operates on the express connection channels.

9. The optical network of claim 8, wherein each of the plurality of optical amplifiers comprises one or more of an Extended Band Erbium-Doped Fiber Amplifier, a Raman amplifier, a Split-Band C+L Erbium-Doped Fiber Amplifier, a Semiconductor Optical Amplifier, and a Tellurite-Doped Fiber Amplifier.

10. The optical network of claim 8, wherein the optical phase conjugator comprises a thin-film optical filter configured to separate the express connection channels and the short connection channels, a high power laser pump, and a passive LiNbO$_3$ crystal to provide a non-linear optical phase conjugation function on the express connection channels.

11. The optical network of claim 8, wherein the optical amplification spectrum comprises at least 128 channels on a 50 GHz grid spacing.

12. The optical network of claim 8, wherein the express connection channels utilize any of quadrature phase shift keying (QPSK), differential QPSK (DQPSK), polarization multiplexing, 16-quadrature amplitude modulation (16-QAM), and optical frequency division multiplexing (OFDM).

13. The optical network of claim 8, wherein at least one of the express connection channels is configured in a loop-back configuration at one of the plurality of terminal nodes to enable termination at one of the plurality of optical add/drop nodes.

14. An optical method, comprising:

receiving a plurality of wavelengths within an optical amplification spectrum of an extended-band optical amplifier, wherein the optical amplification spectrum is partitioned into a set of short connection channels associated with a first set of network nodes and a set of express connection channels associated with a second set of network nodes;

amplifying the entire optical amplification spectrum including the set of short connection channels and the set of express connection channels;

splitting the set of short connection channels and the set of express connection channels;

performing optical phase conjugation on the set of express connection channels;

combining the set of short connection channels and the set of express connection channels;

at a plurality of terminal nodes, utilizing one or more transceivers for the express connection channels, one or more transceivers for the short connection channels, fixed multiplexers for the one or more transceivers for the express connection channels, and a reconfigurable optical add/drop multiplexer for the one or more transceivers for the short connection channels; and at a plurality of optical add/drop nodes, utilizing one or more transceivers for the short connection channels, a band filter to pass the express connection channels, and a reconfigurable optical add/drop multiplexer for one or more transceivers for the short connection channels.

* * * * *